United States Patent [19]

Mager et al.

[11] 4,055,145

[45] Oct. 25, 1977

[54] SYSTEM AND METHOD OF OCEAN THERMAL ENERGY CONVERSION AND MARICULTURE

[76] Inventors: David Mager, 20 W. 64th St., Amherst, Mass. 10023; William E. Heronemus, 730 West St., New York, N.Y. 01002

[21] Appl. No.: 727,681

[22] Filed: Sept. 29, 1976

[51] Int. Cl.$^2$ ............................................. A01K 61/00
[52] U.S. Cl. ......................................... 119/2; 60/641; 165/45; 203/22
[58] Field of Search ..... 119/3; 159/2 MS, DIG. 1 G, 159/DIG. 39; 203/22, 25, DIG. 20; 60/641, 671; 165/45; 202/185 R

[56] References Cited

U.S. PATENT DOCUMENTS

| | | | |
|---|---|---|---|
| 1,493,368 | 5/1924 | Merz | 60/641 |
| 2,006,985 | 7/1935 | Claude et al. | 203/DIG. 17 |
| 2,860,600 | 11/1958 | Cheney | 119/3 |
| 3,347,753 | 10/1967 | Morse | 202/185 R |
| 3,735,736 | 5/1973 | Yee et al. | 119/2 |
| 3,916,832 | 11/1975 | Sweeney | 119/2 |
| 3,928,145 | 12/1975 | Othmer | 119/3 |

Primary Examiner—Hugh R. Chamblee
Attorney, Agent, or Firm—Kenyon & Kenyon, Reilly, Carr & Chapin

[57] ABSTRACT

An integrated system for converting ocean thermal energy to electrical power for use in synthesis of anhydrous ammonia and a mariculture operation for raising a selected species of marine fauna. The mariculture operation is carried out in a lagoon located adjacent to a deep ocean region where the surface water temperature is at least 21° C and the deep nutrient-rich water temperature is no more than about 10° C. A separate working fluid, such as ammonia, operates in a Rankine cycle between the warm and cold seawater temperatures. The deep ocean water is used to condense the working fluid and is then mixed with warm surface water that has been used to evaporate the same working fluid in a closed power cycle. The resulting mixture is directed to the lagoon, where the nutrient-rich component contributes to the growth rate of a selected mariculture species. The warm surface water temperature may be increased by creating a monomolecular evaporation retarding layer in the ocean surface surrounding the power plant intake.

29 Claims, 4 Drawing Figures

SYSTEM AND METHOD OF OCEAN THERMAL ENERGY CONVERSION AND MARICULTURE

BACKGROUND OF THE INVENTION

1. Field of the Invention

The present invention relates to systems and methods for ocean thermal energy conversion and particularly to systems and methods that combine thermal energy conversion with a mariculture operation.

2. Description of the Prior Art

In recent years, rapidly depleting supplies of fossil fuels have led to searches for alternative ways to satisfy worldwide needs for usable energy sources. One area of investigation has been the conversion to useful work of the potential energy represented by the difference in temperature between warm surface water and deep water in tropical and sub-tropical ocean regions.

One of the earliest researchers in the development of practical means for ocean thermal energy conversion (conventionally abbreviated "OTEC") was a Frenchman, Georges Claude. U.S. Pat. No. 2,006,985, issued to Claude and Boucheret on July 2, 1935, describes a system for obtaining power from the difference in temperature between the surface water of tropical seas and the water at great depths. In the Claude system, sun-warmed surface seawater is vaporized at reduced pressure, using the sensible heat of the water to supply the latent heat of vaporization. The steam generated then drives a turbine and is subsequently condensed at a lower pressure by heat transfer to cold deep ocean water.

More recently, in U.S. Pat. No. 3,347,753 issued Oct. 17, 1967 to M. Morse, a seawater desalination plant was proposed in which power extracted from ocean thermal differences is used for pumping as well as desalinization. The Morse system uses a closed-loop secondary working fluid circuit to avoid the problem of having to remove continuously the large amounts of air dissolved in surface seawater in order to maintain the vacuum required for boiling to occur in a Claude-type system. The separate working fluid preferred by Morse is a liquid such as distilled water which will boil readily at the temperature of the surface seawater under reduced pressure.

A further OTEC refinement is presented in U.S. Pat. No. 3,928,145. This patent, issued to Donald F. Othmer on Dec. 23, 1975, discloses a closed cycle thermodynamic system which uses a separate working fluid, such as propane, ammonia, or n-hexane, to power a turbine generator. In the Othmer system the working fluid is evaporated in a flash boiler following heat interchange with warm surface seawater from an adjacent ocean region. After the flash evaporation step, which occurs without the addition of further heat, the working fluid vapor is expanded through the turbine to a lower pressure, at which it is condensed by transfer of its latent heat of vaporization to cold seawater pumped from a deep portion of the same ocean region.

The advantages of using ammonia or one of the other separate-loop thermodynamic fluids suggested by Othmer, instead of distilled water, are not only that no deaeration of large amounts of seawater is required but also that a smaller turbine may be used because of the higher pressure and density of the vapors.

The Othmer Pat. No. 3,928,145 provides an additional advantage, in that the cold, deep seawater used to condense the working fluid of the OTEC power plant is discharged to a mariculture operation, where its rich store of nutrients fertilizes marine plants in a preselected food chain which may include edible shellfish and crustacea.

The potential of the nutrient-rich deep waters of the ocean to increase fish production has long been recognized. In ocean regions where natural upwelling of these deep waters occurs, such as the coastal waters off Peru, the concentration of fish is so great that these areas, comprising only 0.1% of the ocean's surface, supply almost half of the total world fish catch.

Several investigators have suggested the use of artificial upwelling (i.e., piping of deep ocean waters to a selected mariculture site) as a means to increase manyfold the world's production of marine organisms for human and animal consumption. For example, in an article entitled, "Marine Farming" (Scientific American, Vol. 223, No. 6, Dec. 1970), G. B. Pinchot suggests pumping deep water into a central lagoon of an atoll. The lagoon would provide a catchment basin, retaining the nutrients of the pumped seawater at or near the surface.

Similarly, John D. Isaacs and Walter R. Schmitt of the Scripps Institution of Oceanography have written that some atoll lagoons, such as Kwajelein in the Marshall Islands, constitute nearly ideal areas in which nutrient-rich deep seawater could be discharged and confined for use in marine farming. (J. Cons. Int. Explor. Mer, Vol. 33, No. 1, Copenhagen, Nov. 1969).

In "Open Sea Mariculture", Joe A. Hanson, Ed. (Dowden, Hutchinson & Ross, Inc., Stroudsburg, Pennsylvania, 1975), several hundred coral atolls in the Pacific and Caribbean Oceans are considered to share basic characteristics suitable for mariculture. These characteristics include almost completely enclosed lagoons and proximity to deep water where phytoplankton nutrients are available. Among Pacific atoll chains cited as being of interest are: the Marshalls, Gilberts, Carolines, Marianas, Line Islands, and the Hawaiian Archipelago. With a suitable rate of nutrient input to an atoll lagoon, a high rate of plankton production should occur. These plankton permit the culturing of secondary marine organisms, such as oysters, mussels, clams, shrimp and the herbivorous finfish, for direct human consumption.

Marine species that have been recommended for cultivation in a marine farming operation include brine shrimp, *Artemia salina*, and various types of penaeid shrimp. In particular, the artificial culture of penaeid shrimp has been the object of lifelong study by Dr. M. Fujinaga (see, for example, U.S. Pat. No. 3,477,406 issued Nov. 11, 1969).

The advantage of combining a mariculture operation with an OTEC power plant is that revenue from several products can be optimized, thereby counteracting the inherently low thermal efficiency of an OTEC plant.

For example, the above-mentioned Othmer patent points out that the theoretical Carnot efficiency of a thermodynamic system operating between a typical warm seawater temperature of 86° F (30° C) and a cold seawater temperature of 41° F (5° C) is only 3.3 percent. As a means of increasing the thermal efficiency of an OTEC plant, the Othmer patent suggests additional solar heating of the warm seawater heat transfer medium in ponds with black bottoms and transparent covers, in various types of known closed tubular systems or pressurized solar heaters, or by dissolving suitable dyes in the water or covering the surface with charcoal, graphite or other black pigment to increase the absorption of solar radiation. By use of such techniques the upper temperature of the thermodynamic system can be raised enough to triple the theoretical Carnot efficiency.

An OTEC power plant large enough to supply the nutrient-rich deep water requirements of a typical atoll lagoon, however, would require such large quantities of warm seawater that solar heaters of conventional design would be impractically large and expensive. Furthermore, the use of a flash boiler, as in the Othmer system, results either in a substantial drop of temperature and pressure from the liquid to the vapor state, in the case of single-effect evaporation, or in high plant cost, in the case of multiple-effect evaporation.

Another economic drawback involved in combining conventional OTEC plants (which typically produce electrical power or desalinated water) with atoll-based mariculture operations is that atolls rarely have sufficient population to consume more than a small fraction of either the electricity or the potable water produced by the plant. Moreover, atolls are usually so far removed from large population centers that transmission of the electric power or shipment of the fresh water produced would not be economically feasible.

On the other hand, there exists a worldwise demand for fertilizer that far exceeds the available supply. An important fertilizer, which is also a basic ingredient for other fertilizers, is anhydrous ammonia. A major portion of ammonia production is by synthesis from hydrogen and atmospheric nitrogen. The usual source for hydrogen in ammonia synthesis plants is natural gas, the supply of which is rapidly dwindling.

SUMMARY OF THE INVENTION

Accordingly, it is an object of the present invention to provide an improved integrated system and method for conversion of ocean thermal energy and mariculture which is not merely economically viable but which promises to yield substantial profits.

It is another object of the invention to improve the systems and method for conversion of ocean thermal energy and mariculture in three basic areas: the generation and conversion of power, the selection of marine life for a mariculture operation, and the preheating of surface seawater.

Specific objects of the present invention are to provide an integrated OTEC plant and mariculture operation in which:

a. the OTEC plant operates on a closed-loop Rankine cycle with a thermodynamic working fluid having a boiling point lower than that of water, b. the working fluid is evaporated and condensed in identical cross-current, plate or plate-fin heat exchangers, preferably having detachable seawater connections to permit alternate operation with warm and cold seawater, c. the streams of warm surface seawater and cold deep seawater used as evaporating and condensing media, respectively, in the OTEC plant are mixed together before discharge into a mariculture lagoon, d. the OTEC plant generates electricity, the major portion of which is used in the production of anhydrous ammonia through an intermediate stage of electrolysis of water, e. the marine species selected for cultivation in the lagoon is adapted for selective mechanized harvesting, and f. the size of the OTEC plant is selected such that the daily discharge of deep nutrient-rich seawater from the plant shall be a predetermined fraction, preferably about one quarter, of the capacity of the lagoon.

The foregoing and other objects are achieved in an integrated system of ocean thermal energy conversion and mariculture in which a lagoon located adjacent to a deep ocean region having suitable warm and cold seawater at the surface and in the deep strata, respectively, is stocked with a preselected species of edible marine fauna. The lagoon is preferably a tropical natural lagoon such as may be found in many atolls in the Pacific Ocean, as well as in the Caribbean and even in the Atlantic. The minimum surface seawater temperature should be about at least 21° C and the deep nutrient-rich seawater should have an average maximum temperature of no more than 10° C.

In the present invention, a separate working fluid such as ammonia is contained in a closed-loop power generating plant which operates on substantially a Rankine cycle in a thermal range between the warm and cold seawater temperatures. The generating plant includes a first heat exchanger connected in the loop and means for connecting a stream of warm surface seawater to the first heat exchanger for evaporating the working fluid at a substantially constant first pressure. A second heat exchanger is connected in the loop, and means for connecting a stream of cold nutrient-rich seawater to a second heat exchanger are provided for condensing the working fluid at a substantially constant second pressure which is lower than the first pressure.

The working fluid vapor leaving the first heat exchanger expands in a turbine generator from the first to the second pressure, thereby producing electric power for use, preferably, in electrolyzing fresh water to produce hydrogen gas. The hydrogen gas is then used as a raw material in a conventional process for synthesizing ammonia. The resulting anhydrous ammonia can be shipped in special vessels to wherever it may be needed as fertilizer in the production of dry land crops. It can also be wetted with fresh water to produce the also useful ammonia liquor which costs less to transport than anhydrous ammonia.

After the stream of warm seawater has passed through the first heat exchanger and the stream of cold seawater has passed through the second heat exchanger, the two streams are mixed and discharged into the lagoon, which has an outlet opposite the discharge point; so that the discharged mixture will not lower the temperature of the incoming surface seawater stream. In the event it is desired to discharge the warm and cold water effluents at or near the OTEC intake pipe, a mixed water discharge plume has properties greater than either of the two for not interfering with the thermal integrity of intake waters.

The mixed streams of cold and warm seawater are at the optimum temperature for stimulating growth of the selected marine species with which the lagoon has been stocked. The preferred species is the Philippine Tiger Shrimp or *Penaeus monodon*. This species of shrimp has several favorable attributes that will be discussed in more detail later and which contribute to the overall efficiency and economic viability of the integrated system.

An important aspect of the present invention is the use of cross current, plate-fin heat exchangers to evaporate and condense the closed-loop working fluid. Such heat exchangers, arranged so that the working fluid flows vertically on the finned side of the plates, may conform to the design proposed in a report entitled "Detailed Analytical Model of Rankine Cycle and Heat Exchangers for Ocean Thermal Difference Power Plants", prepared by the University of Massachusetts under a grant GI-34979 from the National Science Foundation, July 1975. These heat exchangers permit the maximum possible transfer of thermal energy from the seawater heating medium to evaporate the working fluid without the thermal loss or high pressure loss associated with the flash evaporators of prior art OTEC plants.

The OTEC plant of the present invention preferably further includes means for switching the connections between the warm and cold seawater intake pipes and the first and second heat exchangers; so that both heat exchangers can be connected selectively to the cold water stream or to the warm water stream. By switching these connections periodically, such as every 24 hours, fouling of the seawater side of the heat exchanger plates by marine organisms can be substantially reduced, if not completely eliminated. The reason is that organisms which live in the warm surface waters of the ocean cannot survive at the temperature of the deeper ocean layers, and vice versa. Consequently, each time the seawater connections are switched, the marine organisms that may have attached themselves to the heat exchanger surfaces during the previous day's operation will be killed by the sharply different temperature of the other seawater stream and will be flushed out of the heat exchanger.

To improve the thermal efficiency of the OTEC plant, the temperature of the solar-heated surface seawater used as the heating medium in the power plant may be raised still further by providing a monomolecular layer of evaporation-retarding material on the ocean surface surrounding the warm water intake to the plant. Extensive research has been done on the use of film-forming compounds, such as long-chained aliphatic alcohols, to retard evaporation of enclosed fresh-water bodies, but apparently it has never been suggested to use such materials to increase the surface water temperature of an open ocean region.

The invention further includes a method of selectively harvesting the marine fauna with which the lagoon is stocked.

The foregoing and other features of the invention will be presented in more detail in the following description of the preferred embodiment, in conjunction with the accompanying drawings.

DESCRIPTION OF THE PREFERRED EMBODIMENT

Figure 1:
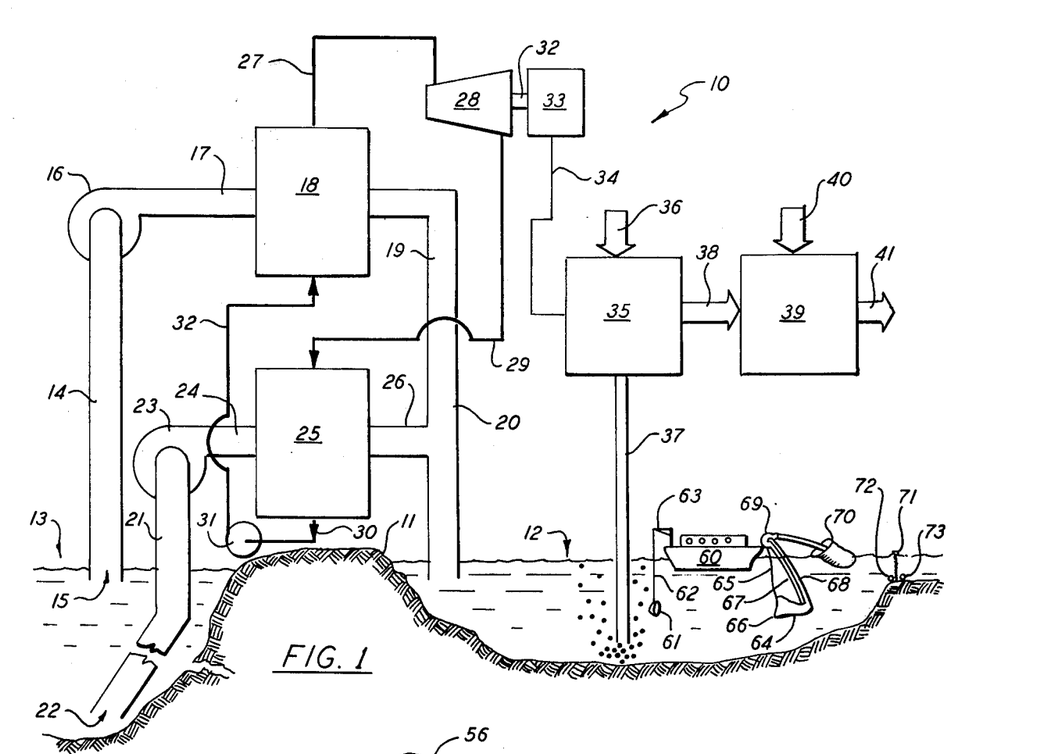
FIG. 1 is a schematic drawing in block diagram form of an integrated ocean thermal energy conversion plant and mariculture system according to the present invention.

Referring to FIG. 1, a system designated generally by 10 and incorporating the integrated ocean thermal energy conversion plant and the mariculture operation of the present invention is located in a land area such as an atoll 11 which encloses a lagoon 12 and is surrounded by a deep ocean region 13.

There are hundreds of suitable coral atolls in the Pacific and Caribbean Oceans having a coral reef surrounding shallow lagoons. Alternatively, the system may be located on an island or continental land mass near the ocean (e.g., the coast of Africa). The lagoon can be artificial (i.e., man-made), but for economic reasons it is preferable to use a naturally occurring lagoon.

The thermal energy conversion portion of the integrated system includes an OTEC plant having an intake pipe 14, with an inlet located near the surface of the ocean region, for supplying warm surface seawater 15 to the intake of a pump 16. The outlet of the pump is connected to a pipe 17 which delivers the warm seawater to a heat exchanger 18. Heat exchanger 18 is preferably of the plate type or plate-fin type, an example of which will be described in more detail below. After passing through the heat exchanger 18, which in the illustrated system acts as an evaporator, the warm surface seawater passes through pipe 19 to a discharge pipe 20 and into the waters of the lagoon 12.

The OTEC plant also has an intake pipe 21 extending into the cold, nutrient-rich, deep waters of the ocean region (approximately to a depth of about 500 meters). Intake pipe 21 has an inlet for the cold deep water 22 and delivers this water to the intake of a pump 23. The outlet of pump 23 discharges the cold seawater through pipe 24 to a second heat exchanger 25, also preferably of plate-fin type and identical in size to the first heat exchanger. In the illustrated system, heat exchanger 18 functions as an evaporator, and heat exchanger 25 functions as a condenser. From the condensing heat exchanger, the cold seawater passes through pipe 26 to mix with the warm seawater leaving the evaporator 18, and the resulting mixture then discharges into the lagoon.

The evaporator 18 and condenser 25 with turbine and essential pumps are connected in a closed loop power generating circuit containing a separate working fluid which will evaporate at the temperature of the warm seawater and will condense at the temperature of the cold seawater. Preferred working fluids include ammonia and propane, but other suitable fluids may be used if desired.

The vaporized working fluid leaves evaporator 18 through pipe 27 and enters turbine 28, where it expands to a predetermined lower pressure and discharges through passage 29 to condenser 25. The working fluid passes through condenser 25 at a substantially constant pressure that is approximately equal to the pressure leaving the turbine and is condensed to the liquid state by means of heat transfer to the cold seawater. The condensed liquid working fluid passes through pipe 30 to the inlet feed pump 31 and is then delivered through pipe 32 to the bottom of heat exchanger 18. There it is evaporated at approximately constant pressure by means of heat exchange from the warm surface seawater. The working fluid vapor then leaves heat exchanger 18 through pipe 27 and repeats the cycle.

The particular advantage of using plate-fin heat exchangers for the evaporator and condenser is that the OTEC plant can operate on a Rankine cycle, in which both evaporation and condensation of the working fluid occur at approximately constant pressure. In flash-type evaporators proposed in prior ocean thermal energy conversion systems there is a pressure drop, and consequent irreversible energy loss in the evaporator or flash boiler, because the working fluid must also serve as the heat transfer medium. That is to say, the latent heat of vaporization is supplied from the working fluid itself, not from a separate heat exchange medium such as the warm seawater in the present system.

As the working fluid vapors expand through turbine 28, shaft 32 turns electrical generator 33, thereby generating electrical power. Some of the power generated is needed to drive pumps 16, 23, 31, and other auxiliaries, as well as to provide power for other necessary functions of the integrated system. A major portion of the power generated, however, is available for other uses. Because most tropical atolls are not heavily populated, the availability of electricity, per se, is not of particular value. Consequently, the integrated system of the present invention preferably uses this electricity to produce a valuable product that can be shipped to other areas of the world for consumption.

In the system of FIG. 1, the excess electricity generated by generator 33 is fed through electrical line 34 to an electrolysis plant 35. Distilled water 36 is also delivered to the plant where it is electrolyzed into outputs of gaseous oxygen and hydrogen. The oxygen is delivered through pipe line 37 to the bottom of the lagoon, where it bubbles up to provide oxygen enrichment to the lagoon waters. The hydrogen output of the electrolysis plant is delivered through pipe 38 to a conventional anhydrous ammonia plant 39.

In plant 39 the hydrogen is combined with nitrogen supplied from the air 40 under heat and pressure to produce an output stream of anhydrous ammonia 41. Anhydrous ammonia is a widely used fertilizer, by itself, and also is the base chemical for the entire fertilizer industry. Since the bulk of anhydrous ammonia currently produced is derived from natural gas, the integrated system of the present invention provides a valuable and much needed source of hydrogen independent of the supply of natural gas.

As mentioned above, the deep, cold seawater used for condensing the working fluid in heat exchanger 25 is rich in nutrients. After absorbing heat from the working fluid and mixing with the surface water which is passed through the evaporator 18, the temperature of this nutrient-rich water is greater than 15° C. This is an ideal temperature for the growth of certain marine fauna that are raised in the mariculture operation which comprises the other portion of the integrated system of the present invention. This operation will be described in more detail below.

Heat Exchanger Design

An important feature of the present invention is the type of heat exchanger used in the thermal energy conversion plant. Preferably the heat exchangers used for the evaporator and condenser functions are identical; so that they can be switched from one function to the other on a periodic basis. By such switching, the heat exchanger surfaces on the seawater sides will be exposed to warm seawater during one period and to cold seawater during another period. Since the microorganisms naturally occurring in the warm seawater cannot survive in the cold seawater, and vice versa, switching the seawater intake to the heat exchangers periodically will cause the organisms of one type, which have attached themselves to the heat exchanger surfaces and started to grow thereon, to be killed and swept away by the subsequent flow of the other type of seawater. This will practically eliminate the problem of marine fouling with its consequent reduction in heat exchange effectiveness.

Figure 2:
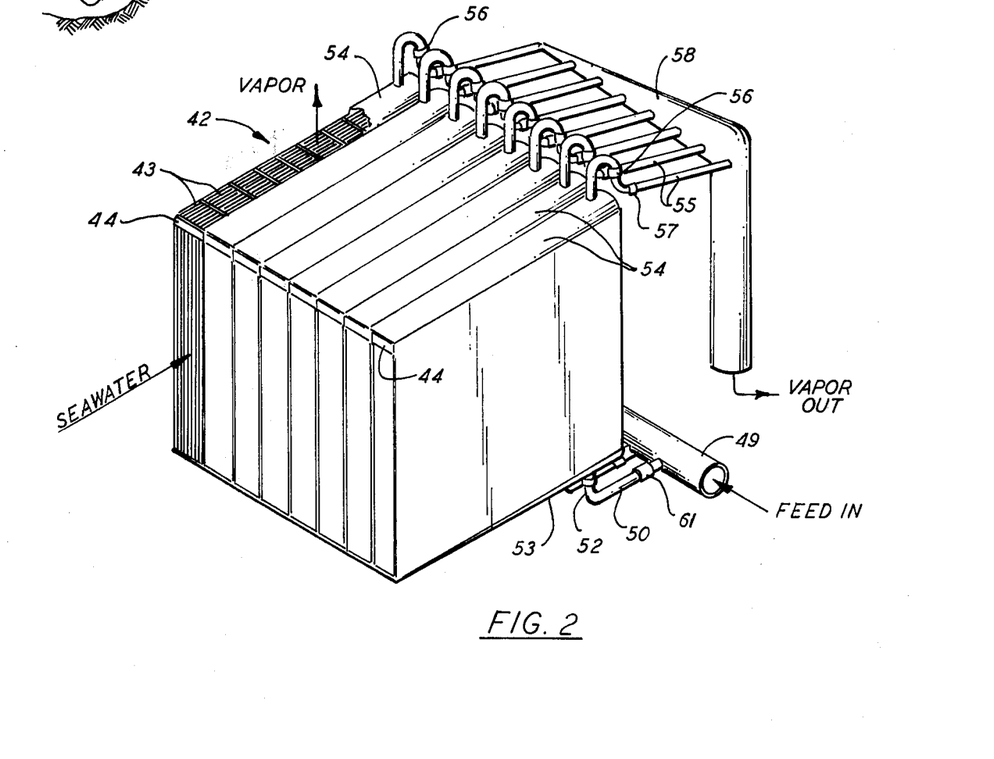
FIG. 2 is a simplified perspective drawing of a preferred modular plate type or plate-fin heat exchanger arrangement for the ocean thermal energy conversion plant.

A particularly preferred plate-fin heat exchanger arrangement is shown in FIG. 2. This arrangement represents a design developed at the University of Massachusetts under a grant GI-34979 from the National Science Foundation, Research Applied to National Needs (RNNN) Washington, D. C. and described in a report entitled "Detailed Analytical Model of Rankine Cycle and Heat Exchangers for Ocean Thermal Difference Power Plants" (Report NSF/RNNN/SE/GI-34979/TR/75 /7)and dated July, 1975.

Such a heat exchanger, designated generally by 42, comprises a number of plate-fin modules 43, which may be approximately 4 feet square by 32 feet high or less. The modules are arranged in rows within separate supporting frames 44, and the frames, in turn, are assembled side by side to provide a heat exchanger of predetermined surface area.

Figure 3:
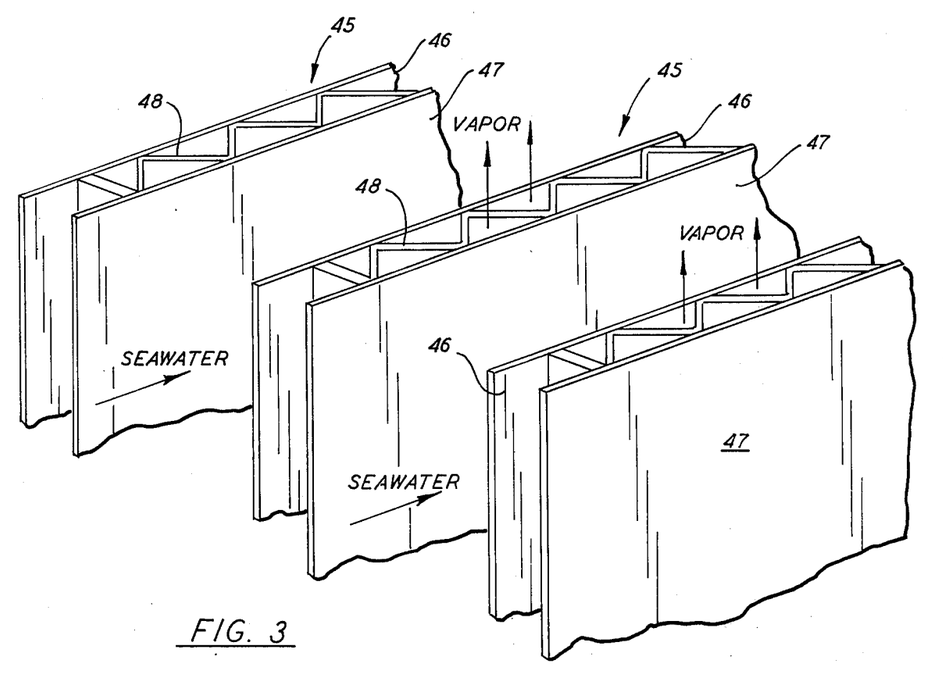
FIG. 3 is a magnified perspective drawing of the finnned plates in a portion of one of the heat exchanger modules of FIG. 2.

Referring to FIG. 3, each module comprises a number of parallel plate-fin sections 45. Each plate-fin section is formed of two thin parallel plates 46 and 47, spaced apart by fins 48. In the illustrated embodiment fins 48 are in the form of a continuous corrugated plate, welded or brazed alternately to parallel plates 46 and 47. Other fin arrangements can be used if desired, but the corrugated plate fin has the advantages of simplicity and economy of fabrication and of providing a highly rigid plate-fin sandwich.

Typically, each plate 46 and 47 may be 4 feet wide and 32 feet high or less and have a thickness on the order of 0.015 inch. The corrugated plate used for the spacing fins may have a pitch of approximately one quarter inch and a peak-to-peak thickness of about one eighth inch. Thus, the spacing between the plates of each plate-fin section is quite small, being only about one eighth inch. In the plate-fin modules, the spacing between sections is preferably about one half inch.

As shown in both FIG. 2 and FIG. 3, seawater flows horizontally through the half-inch spaces between the plate-fin sections, while the working fluid flows vertically inside each plate-fin section (i.e., on the finned side). Normally the working fluid will flow upward through the evaporator and will flow downward through the condenser.

Referring again to FIG. 2, the plate-fin modules are arranged in horizontal rows such that seawater flows from one side of each row all the way through to the other side. The heat exchanger is shown connected as an evaporator, with liquid working fluid supplied through main supply pipe 49 to branch pipes 50, through lower feed valves 51 and upper feed valves 52, to a feed header 53 at the bottom of each row of plate-fin modules. From the feed header, the working fluid flows upward at substantially constant pressure and temperature, absorbing heat from the warm seawater; so that it emerges from the top of the heat exchanger as saturated vapor.

The saturated working fluid vapor from each row is collected in a vapor header 54 and passes through an individual branch vapor pipe 55, upper vapor valve 56, and lower vapor valve 57 to a vapor collection pipe 58. From the vapor collection pipe the working fluid vapor is delivered to the turbine, as shown in FIG. 1. When the heat exchanger is connected as a condenser, the flow of the working fluid is in the opposite direction, and as it passes downward through the plate-fin modules the vaporized fluid gives up heat to the cold seawater so that it leaves the bottom of the heat exchanger as condensed liquid.

Whether the heat exchanger is used as a condenser or an evaporator, each row of modules 43 constitutes a removable subassembly in a separate frame 44. If any one of the subassemblies needs to be removed for repair of leaks or any other reason, it can be isolated from the system by shutting valves 51, 52 in the lower branch line 50 and valves 56, 57 in the upper line 55. Each branch line has a releasable connection between the respective shutoff valves, thereby allowing the entire exchanger row subassembly, including headers 53, 54 and valves 52, 56 to be lifted out of the heat exchanger for repair or replacement.

Mariculture Operation

As mentioned previously, an important aspect of the present invention is the integration of a mariculture operation with the previously described ocean thermal energy conversion plant. Although marine farming has been conducted on a small scale for thousands of years, several problems have prevented adaptation of the techniques to large scale operations. These include the cost of constructing rearing ponds, feeding the marine animals under cultivation and protecting them until they are harvested. In addition, there are the hazards of disease, parasites, predators, and competitors within the marine environment. The mariculture operation of the present invention avoids all these problems.

The mariculture rearing site preferred in this system is an enclosed lagoon of a tropic or semi-tropic atoll. Fortunately, there are hundreds of coral atolls in the tropic and semi-tropic seas that are suitable for marine farming. A particularly suitable atoll of this group has been selected for a planned system and will be described in a specific example of the invention below.

In selecting a site, it is important that the chosen lagoon, if it is naturally occurring, be almost totally enclosed to provide protection for the marine organisms being cultivated. Desirably, there should be only one entrance to the lagoon; so that all seawater discharged from the OTEC plant may be delivered to the end of the lagoon opposite the opening. This arrangement permits not only a unidirectional flow of fresh, nutrient-rich seawater through the lagoon, but also prevents the seawater discharged from the OTEC plant at about 15° C, for example, from mixing with the much warmer surface seawater outside the lagoon from which the OTEC plant derives its heating medium.

Another important feature of any selected site is that it be adajcent to a deep ocean region (i.e., more than 500 meters deep) to provide a source of the cold, nutrient-rich seawater that acts as a condensing medium for the OTEC plant and a food source for the plant matter in the lagoon, the plants in turn providing nourishment for the selected marine species.

An additional consideration in site selection is that the size of the lagoon provide an appropriate match to the contemplated size of the OTEC plant; so that the daily effluent from the plant will be a significant fraction of the total volume of the lagoon. Preferably the flow rate should be in the range of from about one-tenth to about one-third the volume of the lagoon on a daily basis.

With respect to selection criteria for the marine organism to be grown in the lagoon, it is important that it be rapidly maturing, resistant to disease, and, of course, edible. There are other attributes of such an organism that can make a substantial difference in the practicality and economy of harvesting the marine crop. In the preferred mariculture operation of the present invention the marine organism is selected to be non-cannibalistic, non-burrowing, and have behaviors which facilitate harvesting.

Species under culture can be harvested using all or part of the apparatus shown in FIG. 1, where a fishing boat 60 lowers a light or sonic source 61 on a cable 62 from a boom 63 to a predetermined depth at which the selected marine species of the size desired for harvesting is known to reside. After this the fishing boat also lowers a trawl net 64 from cables 65 to the same depth. This net is equipped with electrical pulse or continual flow electrodes 66 to stun animals or set them to swimming into the net. The net has a mesh size equal to the smallest size of the organism to be harvested, thereby allowing smaller members of the species to escape. The technique of netting fish in this manner is known as eumetric fishing. Small tubing 67 delivers compressed air to the end of the net and the harvested species is carried up a wide hose 68 by a column of air and water. This allows for continuous harvesting operations. The compressed air line can be eliminated and replaced with a fish pump 69 on the surface end of the wide delivery hose. At the surface the wide hose empties into watertight floating bags 70 of approximately 2-ton capacity. As each of these bags is filled, another bag is put in its place. When a train of these full bags of desired length is achieved, the whole train is dragged through the water to the processing plant where one by one the bags are lifted out of the water.

Also shown in FIG. 1 is a barrier 71 placed across the opening of the lagoon to prevent entry of predator species from the outside ocean area into the lagoon. The barrier can be made in the form of a net. On either side of the net are positioned perforated pipes 72 and 73 through which air is pumped under pressure. The air escapes through the perforations to form bubble screens which prevent escape of the species being reared within the lagoon and provide a secondary barrier against entry of undesired species from outside the lagoon. In concert with or independently of this arrangement, electrical barriers can be constructed. In addition to the barriers, the normal unidirectional flow of seawater for the OTEC exhaust through the lagoon to the opening will tend to keep undesired marine organisms outside the lagoon.

EXAMPLE

Figure 4:
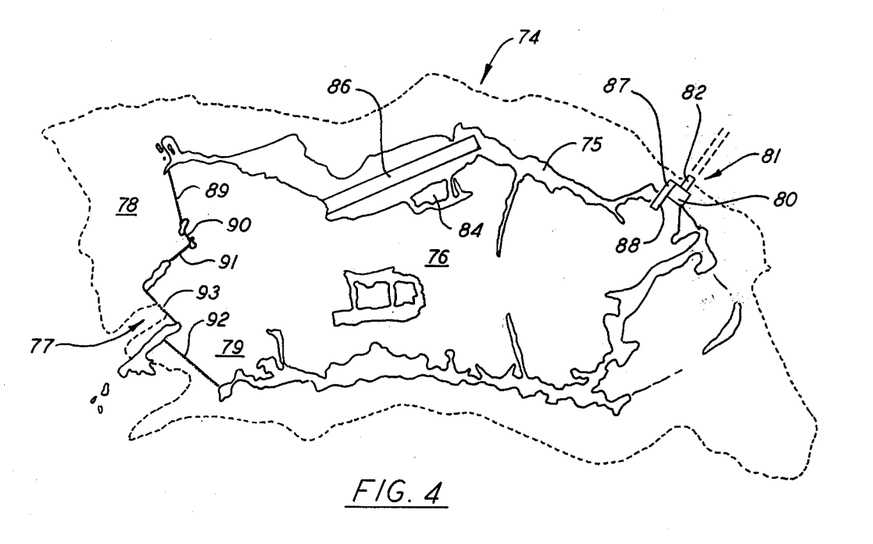
FIG. 4 is a plan view of a planned integrated atoll-based ocean thermal energy plant and mariculture operation.

Referring to FIG. 4, a particular atoll, located in the Line Island Chain approximately 1,000 miles south of Hawaii, is designated generally by the numeral 74. This atoll comprises a series of connected coral islands 75 that almost completely enclose an 800 hectare (2,000 acre) lagoon 76 except for a ship channel 77 and reef flats 78 and 79 at the western end of the lagoon.

An OTEC plant 80 is located on the reef at the eastern end of the lagoon opposite the open end. This OTEC plant will have a warm seawater inlet 81 to the surface waters adjacent the plant. A long intake pipe 82 extends down to at least the 500 meter level in the deep ocean region adjacent to the atoll for delivering cold nutrient-rich seawater to the OTEC plant.

The OTEC plant 80 will consist of the elements depicted in FIG. 1, namely: an evaporating heat exchanger, a condensing heat exchanger, a closed-loop electric generating circuit, a distilled water electrolyzing plant and an ammonia synthesizing plant. An outlet 83 leads from the OTEC plant to the eastern end of the lagoon for discharging the mixed streams of warm and cold seawater after they have passed through the respective evaporator and condenser in the OTEC plant.

Additional features of the selected atoll include secondary lagoon 84, which will be used as a hatchery for developing the cultivated marine organisms to a size at which they can be transferred to the main lagoon 76. The facilities on the island also include an air strip 86, a product freezing and packaging plant 87 and a loading dock 88.

Gabions, pilings, oil drums and dredge spoils form a wall 89, 90, 91 and 92 to prevent outside predators from crossing the reef flats into the lagoon, and a marine barrier 93 similarly closes the ship channel.

To indicate the order of magnitude of the planned operation, the OTEC plant will draw 15,000 cubic meters (4 million gallons) per minute of deep ocean water through a 12 meter (40 foot) diameter intake pipe for use in a 50 megawatt electrical generating plant. This flow of cold deep water, and the corresponding flow of warm surface water, will result in a daily input to the lagoon equal to approximately one-fourth its total volume. Calculations of the nutrients supplied thereby indicate that approximately 47,000 metric tons of a selected species of marine organism can be harvested each year from the lagoon.

The particular species of organism contemplated for the planned system is the giant Phillippine Tiger Shrimp (*Penaeus monodon*). This organism is considered to present an optimum blend of the characteristics enumerated above. Other species with relatively good characteristics for culture in this situation are: raft culture of oysters or sea weeds, menhoden-tuna, tapes clam, tilapia unisex hybrids, and mullet.

In processing, the shrimp will be drawn from the dracones into a flume, then graded by size and deheaded. The heads will be converted into shrimp meal for shrimp paste and chiton, and the tails will be frozen for shipment to the ultimate consumer.

As discussed earlier, it is highly desirable from the standpoint of efficiency for the temperature of the surface seawater used in the OTEC plant to be as high as possible. With the huge volumes of water required by the warm water intake for the OTEC, conventional designs for solar heating ponds are economically unfeasible. An economic alternative is the application of a monomolecular layer of an evaporation retarding chemical such as one of the long chain saturated aliphatic alcohols.

Monomolecular layers can be applied to the surface layer from shore based or floating robot dispenser stations. With knowledge of insolation, currents and winds, the monomolecular layer can be applied in quantities and in areas which would most contribute to the superheating of the OTEC hot water intake.

Although such films conventionally are used to retard evaporation of a closed body of fresh water, the concurrent prevention of heat loss by evaporation achieved by the film in the present application should result in a substantial temperature rise of the waters in the forebay. In this way, a marked increase in thermal efficiency of the OTEC plant can be achieved at a negligible cost. Thus, the present application provides an ecologically and economically optimized system for practical conversion of ocean thermal energy.

Although the foregoing description covers a preferred embodiment of the system of the invention, it will be clear to those skilled in the art that variations in detail can be made within the scope of the invention.

What is claimed is:
1. An integrated system of ocean thermal energy conversion and mariculture comprising:
a lagoon located adjacent to a deep ocean region having warm seawater at the surface of the region and nutrient-rich cold seawater at a predetermined depth below the surface, the surface seawater in said region having an average minimum temperature of at least about 21° C and the deep nutrient-rich seawater having an average maximum temperature of no more than about 10° C, the lagoon being stocked with a preselected species of edible marine fauna;
a passageway connecting the lagoon to the adjacent ocean region;
a closed loop power generating plant located adjacent to the lagoon, said closed loop containing a working fluid capable of operating in a Rankine cycle between the warm and cold seawater temperature, and said generating plant including
a first heat exchanger connected in said loop and having a separate seawater side;
means for delivering a stream of warm surface seawater from said ocean region to the seawater side of said first heat exchanger for evaporating the working fluid at a substantially constant first pressure;
a second heat exchanger connected in said loop and having a separate seawater side;
means for delivering a stream of cold nutrient-rich seawater from said predetermined depth of the ocean region to the seawater side of the second heat exchanger for condensing the working fluid at a substantially constant second pressure lower than said first pressure;
pumping means connected in said loop between the second and first heat exchangers for pumping the working fluid as liquid from the second heat exchanger at said second pressure to the first heat exchanger at said first pressure;
power generating means connected in said loop between the first and second heat exchangers for extracting useful work from the working fluid as a vapor expanding from said first pressure to said second pressure; and
conduit means having an inlet connected to the seawater sides of the first and second heat exchangers and an outlet into the lagoon approximately opposite the passageway connecting the lagoon with the adjacent ocean region for mixing the streams of cooled surface seawater from the first heat exchanger and the warmed nutrient-rich deep seawater from the second heat exchanger and discharging the mixed streams into the lagoon at an optimum temperature for growth of said preselected marine fauna.

2. An integrated system of ocean thermal energy conversion and mariculture according to claim 1 wherein the edible marine fauna comprises a species of shrimp.

3. The system of claim 2 wherein the species of shrimp is *Penaeus Monodon*.

4. The system of claim 1 further comprising a foraminous barrier across the passageway connecting the lagoon with the adjacent ocean region for preventing ingress of marine predators into the lagoon.

5. The system of claim 4 further comprising a perforated pipeline extending along the bottom of the passageway adjacent to the foraminous barrier and means for supplying air under pressure to the perforated pipeline to produce an air bubble curtain to prevent the preselected marine fauna from escaping from the lagoon.

6. The system of claim 1 wherein the first and second heat exchangers each comprises a plate-fin type of heat exchanger.

7. The system of claim 1 wherein each plate-fin heat exchange comprisess a multiplicity of parallel spaced flat plates and a multiplicity of spaced fins connecting alternate pairs of said plates, with the finned spaces between plates comprising one side of the heat exchanger and the spaces that alternate with the finned spaces comprising the other side.

8. The system of claim 7 wherein the working fluid is contained on the finned side of the heat exchanger.

9. The system of claim 8 wherein the other side of each heat exchanger comprises the seawater side.

10. The system of claim 9 wherein each heat exchanger is positioned with the plates substantially vertical and the fins extending vertically from top to bottom.

11. The system of claim 10 wherein each heat exchanger comprises a vapor header extending along the tops of the plates and a liquid hotwell extending along the bottoms of the plates, the vapor header and liquid hotwell of each heat exchanger being connected into the closed loop for the second fluid.

12. The system of claim 1 wherein the means for delivering warm surface seawater to the first heat exchanger comprises a pipe having an inlet located just below the surface of the adjacent ocean region and an outlet releasably connected to the seawater side of the first heat exchanger and a hot side pump located in said pipe for drawing surface seawater from the ocean region and discharging the seawater through the seawater side of the heat exchanger.

13. The system of claim 12 wherein the means for delivering cold nutrient-rich seawater to the second heat exchanger comprises an elongated conduit having an inlet located at said predetermined depth and an outlet releasably connected to the seawater side of the second heat exchanger and a cold side pump located in said pipe for drawing deep cold seawater from said predetermined depth and discharging the seawater through the seawater side of the second heat exchanger.

14. The system of claim 13 comprising means for switching the releasable connections between the warm and cold seawater intake pipes and the first and second heat exchangers so that the first heat exchanger can be connected to the cold water pipe and the second heat exchanger can be connected to the warm water pipe, whereby microorganisms attaching themselves to seawater side heat exchanger surfaces from a stream of seawater at one temperature can be killed and removed by switching to a stream of seawater at the other temperature.

15. The system of claim 1 wherein the daily discharge rate of the mixed streams of seawater into the lagoon is equal to a predetermined fraction of the lagoon capacity.

16. The system of claim 15 wherein said daily discharge rate is equal to approximately one quarter of the capacity of the lagoon.

17. The system of claim 1 wherein the means for extracting useful work from the working fluid as vapor expanding from the first pressure to the second pressure comprises a turbogenerator, and the system further comprises means operated by electricity produced by said turbogenerator for electrolytically dissociating water to produce hydrogen and oxygen and means for pumping the electrolytically produced oxygen into the lagoon for oxygen-enriching the waters therein.

18. The system of claim 17 further comprising an ammonia synthesizing plant and means for pumping the electrolytically produced hydrogen to said synthesizing plant for use in the production of anhydrous ammonia.

19. The system of claim 18 wherein the working fluid is ammonia.

20. An integrated process for converting ocean thermal energy and conducting a mariculture operation comprising:
  a. providing a first stream of warm solar heated seawater having an average minimum temperature of at least about 21° C;
  b. evaporating a separate stream of a working fluid at a substantially constant predetermined first pressure by heat exchange with the stream of warm seawater;
  c. expanding the separate stream of vaporized working fluid through a turbine generator to a predetermined second pressure lower than the first pressure;
  d. providing a second stream of cold nutrient-rich seawater having an average maximum temperature of no more than about 10° C;
  e. condensing the separate stream of working fluid at a substantially constant pressure approximately equal to said second pressure;
  f. pumping the separate stream of condensed working fluid from the second pressure to approximately the first pressure for recycling through step (b);
  g. mixing the first stream of warm seawater with the second stream of nutrient-rich cold seawater after steps (b) and (e);
  h. delivering the mixed first and second seawater streams to a lagoon;
  i. stocking the lagoon with a preselected species of edible marine fauna; and
  j. selectively harvesting said species of marine fauna when grown to a predetermined size.

21. The process of claim 20 wherein the daily rate of flow of the mixed first and second streams into the lagoon is approximately one-fourth the capacity of the lagoon.

22. The process of claim 20 wherein the preselected edible marine fauna exhibit optimum growth characteristics at the temperature of the mixed streams.

23. The process of claim 20 wherein the edible marine fauna comprises a species of shrimp.

24. The process of claim 22 wherein the species of shrimp comprises *Penaeus monodon*.

25. The process of claim 20 wherein the step of harvesting the marine fauna comprises:

providing attraction device in a region of the lagoon at a depth at which the preselected marine species of said predetermined size is known to residue netting the marine species attracted by said device in a net having a mesh size adapted to permit escape of marine fauna smaller than said predetermined size.

26. The process of claim 25 wherein the attraction device is a light.

27. The process of claim 25 wherein the attraction device is a sonic source.

28. The process of claim 20 wherein the step of providing a first stream of warm solar-heated seawater comprises withdrawing said stream from just below the surface of an open ocean region.

29. The process of claim 28 comprisng forming a monomolecular layer of evaporation retarding material on the surface of said open ocean region for increasing the heating effectiveness of the solar energy received thereby.

* * * * *